United States Patent [19]

Carter, Jr. et al.

[11] 3,923,758

[45] Dec. 2, 1975

[54] SUBSTANTIALLY HEXANE SOLUBLE PROPYLENE/BUTENE-1 COPOLYMER CONTAINING 30 TO 75 WEIGHT PERCENT BUTENE-1

[75] Inventors: Edward H. Carter, Jr., Kingsport, Tenn.; Robert E. Holliday, Longview, Tex.

[73] Assignee: Eastman Kodak Company, Rochester, N.Y.

[22] Filed: July 2, 1973

[21] Appl. No.: 376,077

[52] U.S. Cl. .............................. 260/88.2; 260/93.7
[51] Int. Cl.² . C08F 10/06; C08F 10/08; C08F 4/64
[58] Field of Search ........................ 260/88.2, 93.7

[56] References Cited
UNITED STATES PATENTS

| 2,918,457 | 12/1959 | Jezl | 260/88.2 |
| 3,639,515 | 2/1972 | Hagemeyer et al. | 260/878 B |
| 3,644,309 | 2/1972 | Duck et al. | 260/80.78 |
| 3,669,948 | 6/1972 | Konotsune et al. | 260/93.7 |
| 3,679,775 | 7/1972 | Hagemeyer et al. | 260/878 B |

FOREIGN PATENTS OR APPLICATIONS

| 1,059,978 | 2/1967 | United Kingdom |
| 1,113,898 | 5/1968 | United Kingdom |

*Primary Examiner*—Joseph L. Schofer
*Assistant Examiner*—A. L. Clingman

[57] ABSTRACT

An amorphous propylene/butene-1 copolymer containing from about 30 to about 75 weight percent butene-1, and having a melt viscosity of about 100 to 100,000 centipoise at 190°C., a solubility in refluxing hexane of at least 99 weight percent, a solubility in refluxing diethyl ether of at least 60 weight percent, a ring and ball softening point in the range of about 78° to 120°C. and a Differential Scanning Calorimeter melting point not greater than 120°C.

8 Claims, No Drawings

SUBSTANTIALLY HEXANE SOLUBLE PROPYLENE/BUTENE-1 COPOLYMER CONTAINING 30 TO 75 WEIGHT PERCENT BUTENE-1

This invention relates to a novel process for preparing propylene/butene-1 copolymers and the product prepared thereby. More specifically, it relates to low molecular weight predominantly amorphous, hexane soluble propylene/butene-1 copolymers having a unique combination of properties. Another aspect of this invention relates to a novel high temperature polymerization process for preparing these copolymers.

Previously, considerable work in the polymer art has been directed towards the polymerization of propylene and higher olefins with stereospecific catalysts. The homopolymers and copolymers produced in these polymerizations have found many uses, e.g., molded objects, film, coatings, sheeting and the like providing for a significant commercial success for polypropylene and propylene/ethylene copolymers. However, due to their high molecular weight and predominantly crystalline structure the gross polymers prepared by such processes do not have the necessary combination of properties for use in applications such as hot melt adhesives and protective coatings. For example, to be useful in hot melt adhesives a polymer must have, in addition to good adhesive and cohesive strength, a relatively low viscosity at moderate temperatures and a constant melt viscosity-temperature relationship over a broad range of temperatures to provide flexibility in both handling and application. In addition, the polymer should be predominantly amorphous to minimize the effects of crystallization on the adhesive and melt flow properties.

None of the prior art propylene containing polymers have the desired combination of properties for use as a hot melt adhesive with the exception of certain hexane soluble amorphous polypropylenes. These amorphous polypropylenes are normally obtained as a by-product in the production of crystalline polypropylene by the high temperature solution polymerization of propylene with stereospecific catalysts. Although these amorphous polymers are useful in may applications, no method has been found for producing them directly and they are always obtained either as a by-product or coproduct depending on the process conditions and catalyst used in the polymerization. This lack of a direct method of producing the amorphous polymer limits production capacity and also necessitates an additional process step to separate the amorphous polymer from the crystalline polymer. Furthermore, the molecular weight of the amorphous polymer is difficult to control. These factors, due to their adverse effect on the economics of the process, severely limit the commercial utilization of amorphous polypropylenes. Therefore, there is a need in the industry for an amorphous propylene based polymer that has the combination of properties required in hot melt adhesives and that can be prepared directly to the desired molecular weight in a commercially practical process.

As previously pointed out, hexane soluble amorphous polypropylene produced as a by-product in the high temperature solution polymerization of propylene with stereospecific catalysts is a useful hot melt adhesive. However, the amount of amorphous polypropylene which can be produced by this method is controlled by the amount and crystallinity of the crude polypropylene produced. For example, the crude polypropylene produced with highly stereospecific catalysts, i.e., those containing titanium trichlorides, contains at least 60 weight percent crystalline (hexane insoluble) polymer and normally greater than 85 percent. This situation severely limits the production of the amorphous component and hence the utilization of this material by industry.

Extensive experimentation has been conducted in an attempt to find a titanium based catalyst system and process conditions which result in the synthesis of amorphous (hexane soluble) polypropylene without producing crystalline polypropylene. In these experiments a number of catalyst systems were evaluated for synthesis of amorphous polypropylene and amorphous propylene-ethylene copolymer. None of these systems produced a completely, i.e. at least 99 weight percent, amorphous polymer. The properties of some of the polymers prepared in this study are given in the following Table I.

Table I

| Catalyst System | Monomers | Propylene POlymers[3] | | |
|---|---|---|---|---|
| | | Physical Properties of the Polymers | | |
| | | R&B Soft. Pt.[2] °C. | Hexane Index,[1] % | Visc. at 190°C., cp. |
| AlE$_3$/AA-TiCl$_3$ | Propylene | 155 | 65.0 | 5,500 |
| Et$_2$AlOEt/TiCl$_4$ | Propylene | 155 | 28.3 | 5,200 |
| Et$_2$AlOEt/TiCl$_4$ | Propylene/Ethylene (12%) | 142 | 19.0 | 4,250 |
| Et$_2$AlOEt/TiCl$_4$ | Propylene/Ethylene (18%) | 136 | 12.8 | 6,560 |
| Et$_2$AlOEt/TiCl$_4$ | Propylene/Ethylene (30%) | 130 | 30.0 | 8,000 |
| AlEt$_3$/TiCl$_4$ | Propylene | 145 | 25.0 | 5,000 |
| Et$_2$AlOEt/AA-TiCl$_3$ | Propylene | 152 | 35.0 | 4,500 |

[1]Amount of polymer insoluble in hexane at 69°C.
[2]Ring and ball softening temperature, °C. (ASTM E28-67).
[3]Solution polymerization at temperature of 160°C. and pressure of 1000 psig with hydrogen added to reduce molecular weight.

Although it is disclosed in the prior art that copolymerization of propylene with higher olefins in the presence of stereospecific catalysts increases the amorphous character of the polymer produced, there is no disclosure or suggestion that a completely hexane soluble propylene/butene-1 copolymer could be produced with highly stereospecific catalysts. Furthermore, the processes disclosed in the prior art for polymerizing propylene/butene-1 mixtures with an organoaluminum compound-titanium trichloride catalyst produce large amounts of hexane insoluble crystalline propylene/butene-1 copolymers. Therefore, it was quite surprising and unexpected when it was discovered that completely hexane soluble propylene/butene-1 copolymers could be produced with an aluminum triethyl-titanium trichloride catalyst or an organopolylithiumaluminum compound-titanium trichloride catalyst at polymerization temperatures greater than 140°C.

The reason for the complete hexane solubility and more random nature of the copolymers prepared by the process of this invention is not known. The reactivity ratios for propylene and butene-1 using an aluminum triethyl/AA-titanium trichloride catalyst in our continuous high temperature solution process were found to be $r_1(C_3H_6) = 1.60$ and $r_2(C_4H_8) = 0.52$ which are essentially identical to the values reported in the literature for this catalyst system. However, propylene/butene-1 copolymers prepared with the aluminum triethyl/AA-titanium trichloride catalyst at temperatures below 140°C. have higher ring and ball softening points and higher hexane insoluble contents than copolymers made at high temperatures. These results indicate that the copolymers made at high temperatures contain more random propylene and butene-1 segments than copolymers made at lower temperatures. Since the monomer reactivity ratios are equivalent at both temperatures, this result was quite unexpected. A possible explanation is that at high temperatures the rate of chain propagation in the copolymerization is considerable higher than at the lower temperatures and as a result shorter and more random segments of propylene and butene-1 are incorporated in the polymer chain.

In accordance with the present invention we have found that certain copolymers of propylene and butene-1, prepared as hereinafter described, have a combination of properties previously not available.

The composition and certain properties of the copolymers of this invention are listed in Table II.

Table II

| | |
|---|---|
| Butene-1 Content, wt. %[a] | 30–75 |
| Propylene Content, wt. % | 25–66 |
| Melt Viscosity Range at 190°C., cp. | 100–100,000 |
| Ring & Ball Softening Temp., °C.[b] | 78–120 |
| Hexane Insoluble Polymer, wt. %[c] | ≤ 1 |
| Ether Insoluble Polymer, wt. %[d] | ≤ 40 |
| DSC Melting Point, °C.[e] | None above the ring and ball softening point |
| Density, g/cc | 0.84–0.87 |

[a]Determined from infrared spectrum on melt sample 2 mil thick.
[b]Determined by ASTM Procedure E28-67.
[c]Determined by extracting 5 gram sample in Soxhlet extractor with hexane at boiling point (69°C.) for 6 hours.
[d]Determined by extracting 5 gram sample with diethyl ether at boiling point (30°C.) for 6 hours.
[e]Determined on Differential Scanning Calorimeter - manufactured by Perkin-Elmer Company - at a heating rate of 20°C./minute.

The copolymers of this invention are prepared by polymerizing a mixture of propylene and butene-1 in a high temperature solution process in the presence of certain stereospecific catalysts, as disclosed in U.S. Pat. No. 3,679,775 which disclosure is incorporated herein by reference.

The catalysts useful in preparing these copolymers are combinations of aluminum trialkyls or organopolylithiumaluminum compounds and a titanium trichloride. Aluminum trialkyls wherein the alkyl radical contains 2 to 8 carbon atoms can be used as one catalyst component with aluminum triethyl being the preferred component. The organopolylithiumaluminum compounds are prepared by reacting a lithium alkyl with an aluminum trialkyl. Lithium alkyls which contain 2 to 8 carbon atoms can be used, with lithium butyl being the preferred component. Methods for the preparation of the organopolylithiumaluminum compounds are disclosed in U.S. Pat. No. 3,679,775, which disclosure is also incorporated herein by reference.

The titanium trichlorides useful as the second component of the catalyst are hydrogen reduced titanium trichloride, activated by trituration (HA—TiCl$_3$), aluminum reduced titanium trichloride, (A—TiCl$_3$) and aluminum reduced titanium trichloride activated by trituration (AA—TiCl$_3$). The preferred form is AA—TiCl$_3$. The hydrogen reduced titanium trichloride (H—TiCl$_3$) is not useful as the second component.

A mole ratio of aluminum trialkyl to titanium trichloride of 0.1/1 to 1.0/1 is satisfactory for preparing the amorphous copolymer with 0.4–0.6/1 being the preferred mole ratios. When an organopolylithiumaluminum compound is used, the mole ratios of lithium to aluminum to titanium are 0.01–0.05/0.1–1.0/1 with 0.05/0.5/1 being the preferred ratio.

The temperature of the polymerization is critical and must be at least 140°C. or above in order to produce the hexane soluble copolymers. The useful range of temperatures is 140° to 250°C. with the preferred range being 150° to 200°C. Although temperature has a specific effect on the molecular weight, melt viscosity, of the copolymer produced, the primary method of controlling melt viscosity is by the addition of hydrogen to the reaction. The amount of hydrogen necessary to maintain the molecular weight in the desired range is from about 0.0002 weight percent to about 0.020 weight percent based on the monomers added to the reaction.

A suitable pressure range for the process includes, for example, pressures from atmospheric to about 2,000 atmospheres or more. Generally, it is preferred to use pressures in the range of about 1,000 to 1,500 psig.

The organic solvents useful as the reaction medium include, for example, aliphatic alkanes or cycloalkanes such as propane, pentane, hexane, heptane, cyclohexane, and the like, or hydrogenated aromatic compounds such as tetrahydronaphthalene or decahydronaphthalene, or an aromatic hydrocarbon such as benzene, toluene, xylene, and the like. The nature of the solvent is subject to considerable variation but should be in a liquid form at the reaction conditions and essentially inert to the reactants and reaction products. A petroleum fraction of suitable boiling range such as odorless mineral spirits (a sulfuric acid washed paraffinic hydrocarbon boiling at 180°–220°C.) is a particularly good and preferred reaction medium. The amount of solvent necessary will depend on the viscosity of the copolymer being produced. For example, when copolymers having a viscosity at 190°C. of less than about 5,000 centipoise are being produced only minor amounts of solvent, i.e., less than 10 weight percent, are necessary. It should also be noted that the polymerization can be carried out without solvent if the viscosity of the amorphous copolymer produced is low enough.

As previously noted, the copolymers of this invention are prepared in a continuous solution process at high temperature. Although hexane soluble copolymers can be prepared in a batch solution process at high temperature, a less random copolymer at a given butene-1 content is obtained than in a continuous process. For example, a propylene/butene-1 copolymer containing 40 weight percent butene-1 and having a melt viscosity of 3,500 centipoise at 190°C. prepared according to this invention in a continuous process has a ring and ball softening point of 103°C. and an ether insoluble content of 22 weight percent, whereas a propylene/butene-1 copolymer having the same butene-1 content and melt viscosity prepared under identical conditions with the exception that the process is batch rather than continuous has a ring and ball softening point of 113°C. and an ether insoluble content of 28 weight percent.

The butene-1 content and melt viscosity desired in a particular copolymer will depend on the end use and is controlled by varying the synthesis conditions. As pointed out in Table II, the butene-1 content can vary from 30 to 75 weight percent with the preferred range being 40 to 60 weight percent. A copolymer containing 30 weight percent butene-1 is obtained by adding to the reactor 35 weight percent butene-1. At butene-1 contents below 30 weight percent the hexane solubility of the copolymer decreases rapidly. As the butene-1 content approaches 75 weight percent the ring and ball softening point and strength of the copolymers become too low to be of practical use.

The melt viscosity (centipoise at 190°C.) of the copolymers can vary from 100 to 100,000 and is controlled primarily by the amount of hydrogen added to the polymerization reaction and to a lesser degree by the reaction temperature. The preferred range of melt viscosities for use as hot melt adhesives and coatings is 1,500–30,000 centipoise and more preferably 3,000–5,000 centipoise. For other applications such as free films and blends with other polyolefins, melt viscosities above 10,000 are desirable.

Typical process conditions for producing the copolymers of this invention in a continuous process are listed in Table II. Catalyst, monomer, solvent, and hydrogen feed rates are for a 6.7 gallon closed loop continuous stirred reactor. Conditions are listed for production of both the entire range of butene-1 contents and melt viscosities and the preferred ranges.

Table II

|  | Range | Preferred |
|---|---|---|
| Reactor Temperature, °C. | 140–250 | 150–200 |
| Reactor Pressure, psig | 0–2,000 | 1,000–1,500 |
| Catalysts | (1) AlEt$_3$/AA-TiCl (2) LiBu-AlEt$_3$-TiCl$_3$ | AlEt$_3$/AA-TiCl$_3$ |
| Catalyst Mole Ratio | (1) 0.1–1.0/1 (2) 0.01–0.05/0.1–1.0/1 | 0.4–0.6/1 |
| Reactor Residence Time, hr. | 2–6 | 3–4 |
| Polymer/Catalyst Yield | 200–1,500/1 | 1,000–1,500/1 |
| Mineral Spirits Feed, lb./hr. | 0.5–4.0 | 0.7–1.0 |
| Catalyst Feed, lb./hr. | 0.0034–0.0075 | 0.004–0.006 |
| Propylene Feed, lb./hr. | 2–8 | 3–7 |
| Butene-1 Feed lb./hr. | 1.5–5.0 | 3–4 |
| Hydrogen Feed, lb./hr. × 10$^4$ | 0.2–16 | 3–6 |
| Reactor Solids, % | 25–95 | 90–95 |
| Propylene Conversion, % | 50–80 | 75 |
| Butene-1 Conversion, % | 25–70 | 60 |
| Polymer Production Rate, lb./hr./gal. | 0.2–1.0 | 1.0 |

This invention can be further illustrated by the following examples of preferred embodiments thereof, although it will be understood that these examples are included merely for purposes of illustration and are not intended to limit the scope of the invention unless otherwise specifically indicated.

EXAMPLES 1–8

Propylene and butene-1 were continuously polymerized in the presence of mineral spirits, an aluminum triethyl/AA-titanium trichloride catalyst, and hydrogen. The polymerization was carried out in a jacketed 6.7 gallon closed loop stirred reactor equipped such that catalyst, solvent, butene-1, propylene, and hydrogen could be metered into the reactor continuously in measured amounts. The copolymer solution was continuously removed from the reactor, passed through a filter and an alumina bed to remove the catalyst residues, and then the copolymer was recovered by stripping away the mineral spirits with hot nitrogen. During the polymerizations the reactor temperature was maintained at 150°–170°C. and the reactor pressure was controlled at 1,000 psi. The catalyst was comprised of aluminum triethyl AA-titanium trichloride at an aluminum/titanium mole ratio of 0.5/1. The catalyst was premixed in a nitrogen dry box in mineral spirits at room temperature in the order of addition AA-titanium trichloride and aluminum triethyl at a concentration of 0.05 pound catalyst per gallon. The operating conditions for producing propylene/butene-1 copolymers containing 30–75 percent butene-1 at viscosities from 1,500 to 30,000 centipoise at 190°C. and ring and ball softening points 80°–120°C. are given in Table III. Included in these tables are the physical properties of the copolymers produced and their paper-to-paper (40 pounds per ream Kraft) adhesive properties.

Table III

| Example No. | Amorphous Propylene/Butene-1 Copolymers | | | | | | | |
|---|---|---|---|---|---|---|---|---|
|  | 1 | 2 | 3 | 4 | 5 | 6 | 7 | 8 |
| Physical Properties |  |  |  |  |  |  |  |  |
| Melt Viscosity at 190°C., cp. | 3,200 | 3,680 | 3,500 | 3,900 | 3,400 | 3,100 | 3,300 | 30,000 |
| Ring & Ball Softening Pt., °C. | 80 | 90 | 95 | 100 | 105 | 110 | 115 | 113 |
| Butene-1 Content, % | 69 | 58 | 53 | 49 | 43 | 38 | 34 | 45 |
| Hexane (69°C.) Insol. Pol., % | <0.1 | <0.1 | <0.1 | <0.1 | <0.1 | 0.5 | 1.0 | <0.1 |
| Ether (30°C.) Insol. Pol., % | 5 | 11 | 15 | 18 | 22 | 26 | 32 | 25 |
| Glass Trans. Temperature, °C. | −20 | −18 | −16 | −13 | −14 | −12 | −11 | −13 |
| Density, g./cc. | 0.85 | 0.85 | 0.86 | 0.86 | 0.86 | 0.87 | 0.88 | 0.87 |
| Pen. Hardness, mm$^{-1}$ | 14 | 13 | 9 | 10 | 8 | 6 | 4 | 6 |

Table III-continued

| Example No. | Amorphous Propylene/Butene-1 Copolymers | | | | | | | |
|---|---|---|---|---|---|---|---|---|
| | 1 | 2 | 3 | 4 | 5 | 6 | 7 | 8 |

Adhesive Properties

| | | | | | | | | |
|---|---|---|---|---|---|---|---|---|
| 2″ Pop-Open, °F. | 120 | 135 | 140 | 150 | 180 | 185 | 190 | 224 |
| 73°F. Peel Strength, g. (24 hr.) | 575 | 530 | 540 | 600 | 505 | 550 | 450 | 967 |
| Delamination Time, min. at 120°F. | 40 | 41 | 35 | 30 | 9 | 3 | <1 | <60 |
| Elev. Temperature Peel, °F. | <86 | <86 | 86 | 90 | 95 | 100 | 105 | 172 |
| Elev. Temperature Shear, °F. | 150 | 155 | 162 | 173 | 184 | 202 | 220 | 200 |

Synthesis Conditions

| | | | | | | | | |
|---|---|---|---|---|---|---|---|---|
| Reactor Type | ←————————— 6.7 gal. stirred loop —————————→ | | | | | | | 6.7 gal. |
| Reactor Temperature, °C. | ←——————————— 168–172°C. ———————————→ | | | | | | | 162 |
| Reactor Pressure, psi. | ←————————————— 1,000 psi. —————————————→ | | | | | | | |
| Catalyst | ←————————————— AlEt₃/AA-TiCl₃ —————————————→ | | | | | | | |
| Catalyst Mole Ratio (Al/Ti) | ←————————————— 0.5/1 —————————————→ | | | | | | | |
| Reactor Residence Time, hr. | 4.35 | 4.35 | 4.35 | 2.95 | 2.82 | 3.10 | 2.75 | 4.33 |
| Polymer/Catalyst Yield | 650 | 755 | 1,300 | 733 | 905 | 1,200 | 1,400 | 1,135 |
| Mineral Spirits Feed, lb./hr. | 0.55 | 0.65 | 0.40 | 0.86 | 0.90 | 0.82 | 0.74 | 0.43 |
| Catalyst Feed, lb./hr. | 0.0062 | 0.0057 | 0.0035 | 0.0075 | 0.0075 | 0.0044 | 0.0035 | 0.0037 |
| Propylene Feed, lb./hr. | 2.20 | 3.01 | 3.47 | 5.34 | 6.05 | 6.31 | 6.70 | 4.02 |
| Butene-1 Feed, lb./hr. | 4.43 | 3.66 | 3.37 | 4.55 | 4.10 | 3.84 | 3.50 | 2.70 |
| Hydrogen Feed, lb./hr. × 10⁴ | 0.85 | 0.93 | 3.4 | 5.6 | 5.6 | 6.0 | 6.2 | None |
| Reactor Solids, % | 90–95 | 90–95 | 90–95 | 90–95 | 90–95 | 90–95 | 90–95 | 90–95 |
| Propylene Conversion, % | 71.0 | 70.0 | 72.4 | 62.5 | 73 | 68.2 | 63.0 | 67 |
| Butene-1 Conversion, % | 62.4 | 61.2 | 60.5 | 48.5 | 60 | 50.4 | 47.4 | 56 |
| Production Rate, lb./hr./gal. | 0.58 | 0.64 | 0.68 | 0.81 | 1.0 | 0.89 | 1.1 | 0.63 |
| Process | ←————————————— Continuous —————————————→ | | | | | | | |

EXAMPLE 9

Using the process as described in Examples 1–8, amorphous propylene/butene-1 copolymer was prepared with a melt viscosity at 190°C. of 3,500 centipoise and a ring and ball softening point of 123°C. which contained 25 percent butene-1. This copolymer shows a hexane (69°C.) insoluble polymer content of 10 percent.

EXAMPLE 10

Using the process as described in Examples 1–8, amorphous propylene/butene-1 copolymer was prepared with a melt viscosity at 190°C. of 3,000 centipoise and a ring and ball softening point of 75°C. which contained 75 percent butene-1. This copolymer shows a hexane (69°C.) insoluble polymer content of <0.1 percent and an ether (30°C.) insoluble polymer content of 2 percent. The usefulness of this copolymer as a hot melt adhesive is borderline due to its low softening point and low strength.

EXAMPLE 11

Using the process as described in Examples 1–8, amorphous propylene/butene-1 copolymers were prepared with melt viscosities at 190°C. of 3,000–4,000 centipoise and ring and ball softening points of 106°–130°C. at reactor temperatures of 80, 100, 120, and 140°C. The properties of the copolymers produced are given in Table IV.

Table IV

| | | | | |
|---|---|---|---|---|
| Reactor Temperature, °C. | 80 | 100 | 120 | 140 |
| Melt Viscosity at 190°C., cp. | 3,000 | 3,900 | 3,450 | 3,250 |
| R & B Softening Point, °C. | 130 | 125 | 120 | 106 |
| % Butene-1 | 56 | 46 | 48 | 50 |
| Hexane Index, % | 13.4 | 12.5 | 10.6 | 1.0 |

The amorphous substantially hexane soluble propylene/butene-1 copolymer containing 30 to 75 weight percent butene-1 can be used alone or in blends with other polymers such as polyethylene, polypropylene and the like, as hot melt adhesives and coatings for substrates, such as paper board, for example. Additives, stabilizers and the like can also be added to the copolymer or copolymer containing blend. The amorphous copolymer can also be modified by reaction with maleic anhydride to form a maleated copolymer. The amorphous copolymer can also be chlorinated.

The invention has been described in detail with particular reference to certain preferred embodiments thereof, but it will be understood that variations and modifications can be effected within the spirit and scope of the invention.

We claim:

1. A solution process for preparing an amorphous propylene/butene-1 copolymer which comprises contacting a mixture of propylene and butene-1, said mixture containing about 30 to 75 weight percent butene-1, with a catalyst mixture comprising a trialkyl aluminum or an organopolylithiumaluminum compound and titanium trihalide of the group consisting of HA—TiCl₃, A—TiCl₃ and AA—TiCl₃ at a temperature of 140°0 to 250°C. and a pressure in the range of about atmospheric to about 2,000 psig.

2. A solution process according to claim 1 wherein said trialkyl aluminum is triethyl aluminum.

3. A solution process according to claim 2 wherein said titanium trihalide is the AA form of titanium trichloride.

4. A solution process according to claim 3 wherein the ratio of triethyl aluminum to the AA form of titanium trichloride is 0.01–1.0/1.

5. A solution process according to claim 4 wherein the ratio of triethyl aluminum to the AA form of titanium trichloride is 0.4–0.6/1.

6. A solution process according to claim 1 wherein said organopolylithiumaluminum compound is the reaction product of lithium butyl and triethyl aluminum.

7. A solution process according to claim 6 wherein said activated titanium trihalide is the HA form of titanium trichloride or the AA form of titanium trichloride.

8. A solution process according to claim 7 wherein the mole ratio of lithium butyl to triethyl aluminum to titanium trichloride is 0.01–0.05/0.1–1.0/1.

* * * * *